US006745557B2

(12) United States Patent
Dixon

(10) Patent No.: US 6,745,557 B2
(45) Date of Patent: Jun. 8, 2004

(54) HYDRAULIC VALVE ARRANGEMENT

(75) Inventor: Glyn Edward Dixon, Cheltenham (GB)

(73) Assignee: Lucas Industries Limited (GB)

( * ) Notice: Subject to any disclaimer, the term of this patent is extended or adjusted under 35 U.S.C. 154(b) by 0 days.

(21) Appl. No.: 10/218,369

(22) Filed: Aug. 14, 2002

(65) Prior Publication Data

US 2003/0033796 A1 Feb. 20, 2003

(30) Foreign Application Priority Data

Aug. 16, 2001 (GB) .............................................. 0120004

(51) Int. Cl.$^7$ ................................................ F02C 9/28
(52) U.S. Cl. .................................. 60/39.281; 251/30.01
(58) Field of Search ........................... 60/39.281, 734; 251/30.01, 30.02, 43

(56) References Cited

U.S. PATENT DOCUMENTS

| 5,214,913 | A | * | 6/1993 | Tani et al. ................ 60/39.281 |
| 5,294,089 | A | * | 3/1994 | LaMarca ................... 251/30.02 |
| 5,809,771 | A | * | 9/1998 | Wernberg ................. 60/39.094 |
| 6,381,946 | B1 | * | 5/2002 | Wernberg et al. ........ 60/39.281 |

FOREIGN PATENT DOCUMENTS

GB 818695 * 8/1959

* cited by examiner

Primary Examiner—Louis J. Casaregola
(74) Attorney, Agent, or Firm—Trexler, Bushnell, Giangiorgi, Blackstone & Marr, Ltd.

(57) ABSTRACT

An hydraulic valve arrangement including a fluid pressure actuable valve which is actuable between a first position in which fluid flow through the fluid pressure actuable valve is prevented and a second position in which fluid flow through the fluid pressure actuable valve is permitted at a first rate. The hydraulic valve arrangement also includes a second valve which is actuable between an open state, in which fuel flows through the second valve at a second rate, and a closed state in which there is no flow through the second valve. The fluid pressure actuable valve is arranged such that, upon initial actuation of the second valve to its open state, the fluid pressure actuable valve is caused to move into the second position, and whereby the fluid pressure actuable valve remains in the second position upon subsequent switching of the second valve between the open and closed states, thereby to permit the rate of flow of fuel through the hydraulic valve arrangement to be varied by switching of the second valve.

8 Claims, 2 Drawing Sheets

Figure 1:
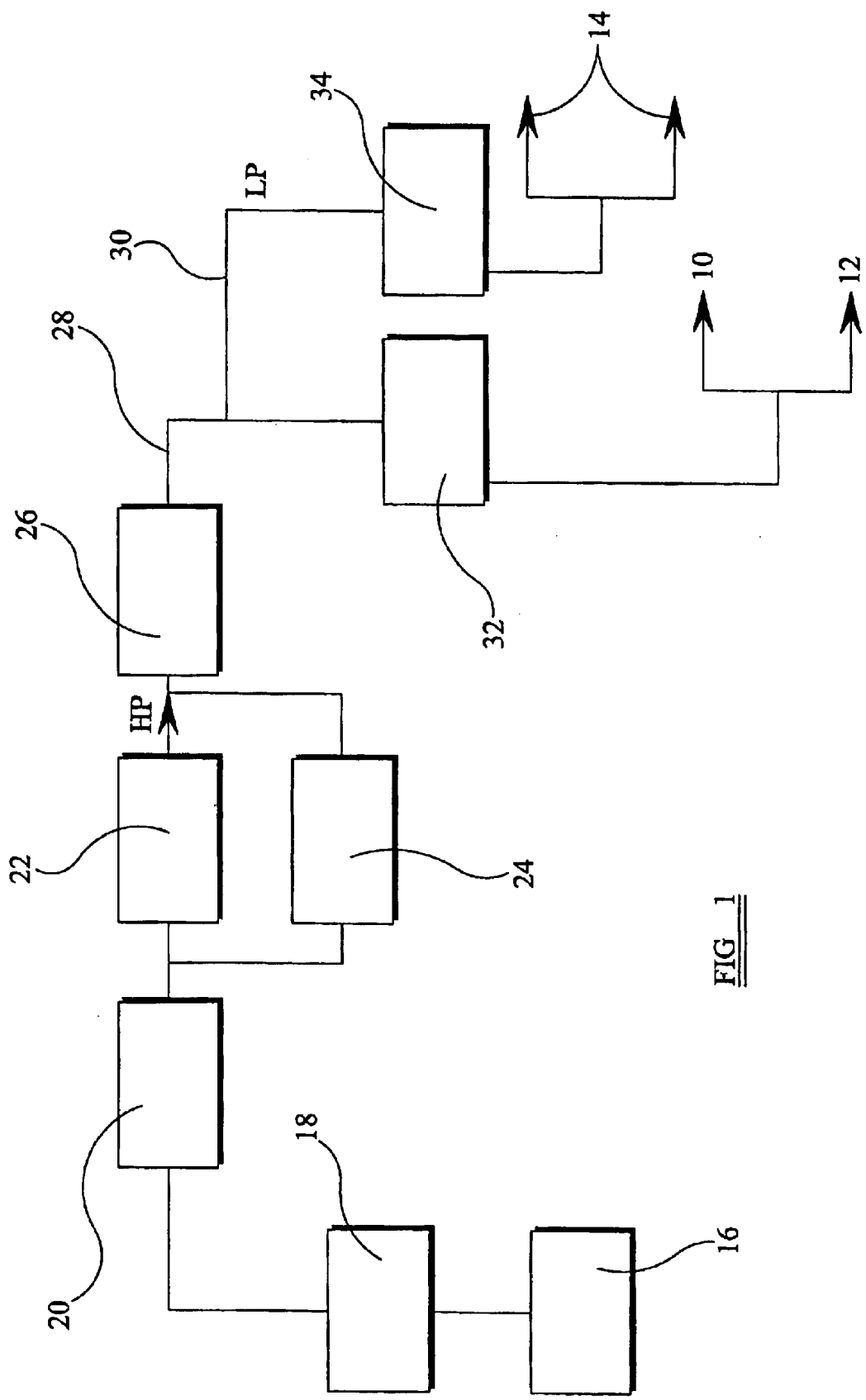

From metering valve arrangement
26

From metering valve arrangement 26

HYDRAULIC VALVE ARRANGEMENT

The invention relates to an hydraulic valve arrangement. In particular, but not exclusively, the invention relates to a valve arrangement which is suitable for use in controlling the flow of fuel to the ignitor jets of a gas turbine engine.

In a multi-stage gas turbine engine, the arrangement of burners commonly includes a set of pilot burners, which are on at all times when the engine is running, and one or more sets of main burners. During the engine start-up sequence, a set of ignitor jets is used to initiate firing of the pilot burners. The pilot burners ignite the main burners which are fired in stages as thrust demand increases.

Within the aircraft fuel system for a gas turbine engine, fuel is pumped from the main fuel storage tanks (usually within the aircraft wings) by means of a first, electrically operated 'lift pump'. The lift pump provides a fuel input to a 'low pressure' engine driven pump which, in turn, supplies a 'high pressure' engine driven pump, usually in the form of a gear pump. The gear pump provides a supply of fuel, pressurised to a relatively high level, for fuelling the engine.

In known fuel supply systems for gas turbine engines, a first Pressure Raising Shut-Off Valve (PRSOV) is provided in the supply path to the pilot burners to enable the flow of fuel to these burners to be shut off. A second PRSOV is provided in the supply path to the main burners for the same purpose. The flow of fuel from the ignitor jets is tapped off from the pilot burner supply path at a position upstream of the first PRSOV and a control valve is provided to control the flow of fuel to the ignitor jets. It is undesirable to provide a further PRSOV in the tapped off supply path to the ignitor jets due to the cost and weight disadvantages.

Upon engine start-up, when fuel within the main sets of burners is ignited and the engine has fully started, there are benefits in maintaining a relatively low rate of flow of fuel to the ignitor jets. A low rate of flow of fuel to the ignitor jets provides a cooling function for the burner, and serves to prevent carbonisation within the burner and the fuel supply pipes which may otherwise cause blockage of the ignitor jets. Additionally, should the engine flame go out in one of the main burners, the permanent supply of re-ignition fuel to the ignitor jets enables immediate re-lighting.

When the aircraft is on the ground and the engine is shutdown, it is important that the flow of fuel to the ignitor jets is terminated. There are circumstances in which it is desirable for the lift pump to be operated when the aircraft is grounded, for example for test purposes or if the aircraft is only landed for a short period of time, and in such circumstances a slightly pressurised fuel flow is maintained in the system. No such fuel is able to leak into the main burners or the pilot burners due to the provision of the first and second PRSOVs which are biased closed by a relatively strong spring force. However, the spring for the ignitor jet control valve provides a weaker biasing force, and the valve is configured such that any slightly pressurised fuel within the system will be sufficient to overcome the relatively weak spring force, thereby causing fuel to leak to the ignitor jets. Any leakage of fuel into the engine when the aircraft is landed and engine operation is halted is highly undesirable as it can result in the production of smoke within the engine at the next engine start-up and, in extreme cases, may result in an explosion. Any fuel leakage from the engine also presents an environmental hazard and increases the risk of ground fire. Furthermore, when the engine is still hot after engine shutdown, a small flow of fuel through the ignitor jets may, if repeated over many occasions, result in blockage of the jets through carbonisation of the leakage fuel.

The aforementioned fuel leakage problem may be overcome through use of a further PRSOV in the flow path to the ignitor jets, but this solution has prohibitive cost and weight implications.

It is an object of the present invention to provide a valve arrangement which enables the above mentioned disadvantages to be overcome.

According to the present invention, there is provided an hydraulic valve arrangement including a fluid pressure actuable valve which is actuable between a first position in which fluid flow through the valve is prevented and a second position in which fluid flow through the valve is permitted at a first rate, and a second valve which is actuable between an open state, in which fuel is able to flow through the second valve at a second rate, and a closed state in which there is no flow through the second valve, the fluid pressure actuable valve being arranged such that, upon initial actuation of the second valve to its open state, the fluid pressure actuable valve is caused to move into the second position, and whereby the fluid pressure actuable valve remains in the second position upon subsequent switching of the second valve between the open and closed states, thereby to permit the rate of flow of fuel through the hydraulic valve arrangement to be varied by switching the second valve.

The invention is particularly advantageous when employed in an aircraft fuel system for a gas turbine engine, where the hydraulic valve arrangement is used to vary the rate of flow of fuel to the ignitor jets of the engine between the relatively high rate required upon engine start-up and the lower rate required when the engine burners are fully operational. The invention also provides the advantage that, when the aircraft has landed and any flow of fuel to the ignitor jets is undesirable, both the fluid pressure actuable valve and the second valve can be adequately closed to prevent fuel leakage to the engine.

In a preferred embodiment, the fluid pressure actuable valve includes a resiliently biased piston member which is moveable between a first position, in which fluid flow through the fluid pressure actuable valve is prevented, and a second position in which fluid flow through the fluid pressure actuable valve occurs at a first, relatively restricted rate. The piston member is preferably moveable within a bore provided in a valve housing.

Preferably, the fluid pressure actuable valve includes first and second control chambers for fluid, whereby the position of the piston member is controlled by controlling fluid pressure in at least one of the control chambers.

The fluid pressure actuable valve is conveniently arranged within a primary flow path for fluid, which is provided with a first restriction through which fluid flows at the relatively restricted rate when said valve is in its second position.

In one embodiment, the second valve comprises a by-pass valve member, for example a spherical valve member, which is engageable with a seating to control fluid flow through a by-pass flow path, whereby when the by-pass valve member is lifted from its seating fluid is able to flow through the by-pass flow path at a second, relatively high rate.

Preferably, the fluid pressure actuable valve and the second valve are arranged such that, upon initial actuation of the second valve to the open state, fluid flows through the by-pass flow path into the second control chamber, thereby applying a force to the piston member to urge the piston member into the second position.

Conveniently, the valve member is actuable by means of an electromagnetic actuator.

When the hydraulic valve arrangement is employed in an engine fuel supply system, once the fluid pressure actuable valve has been moved into its second position upon actuation of the second valve, the hydraulic valve arrangement permits the rate of flow of fuel to be varied simply by switching the second valve between its open and closed states. The hydraulic valve arrangement is configured such that, during subsequent switching of the second valve, the fluid pressure actuable valve remains latched in its second position (i.e. a latched open state). Thus, in use, once the engine has been fully started and only a relatively low rate, cooling flow of fuel to the ignitor jets is required, the flow rate can be switched by moving the second valve to its closed state, in which case fuel is only able to flow to the ignitor jets at a relatively low rate. If engine 'flame-out' occurs, such that a higher flow rate of fuel to the ignitor jets is required to re-ignite the burners, this can be achieved near instantaneously by switching the second valve to its open state, thereby permitting fuel to by-pass the restriction in the primary/ignitor jet flow path by flowing through the relatively unrestricted, by-pass flow path.

Upon engine shut-down, a reduction in fuel pressure within the primary supply path when the supply system pumps are de-activated results in the fluid pressure actuable valve being unlatched (i.e. moving into its first position) to terminate the flow of fuel through the primary flow path. If the second valve is switched to its closed state, flow is also terminated through the by-pass flow path. With both valves closed, fuel leakage to the engine is avoided.

Conveniently, the first control chamber of the fluid pressure actuable valve is supplied with fuel at low pressure from a low pressure fuel reservoir, the pressure of fuel due to fuel within the first control chamber acting in combination with a spring force to urge the piston member towards the first position.

It is important that the flow capacity of the ignitor jets, or any restriction to fuel flow downstream of the point of communication between the primary and by-pass flow paths, is less than the flow capacity through the second valve. In this way, fuel pressure in the connection to the ignitor jets will cause fuel to flow via the by-pass flow path into the second control chamber upon actuation of the second valve. This ensures the piston member is urged away from its first position, into its second position, and remains 'latched' in its second position during subsequent switching of the second valve.

Figure 2:
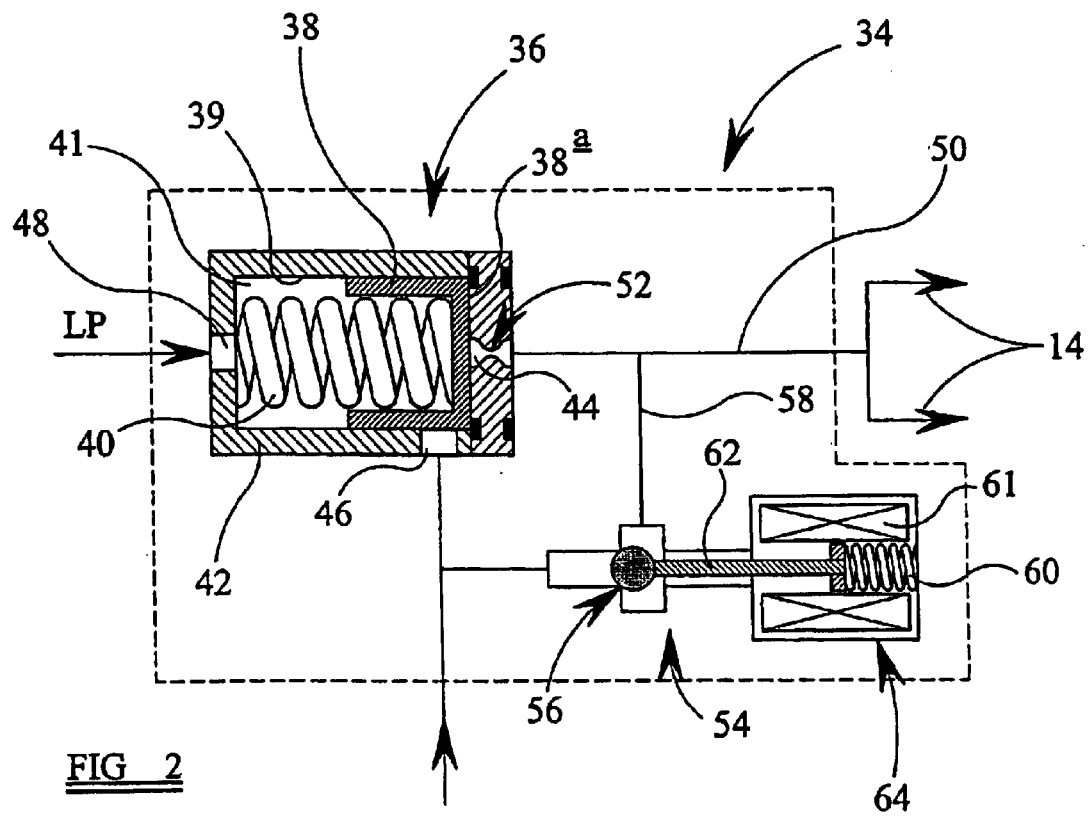
Figure 3:
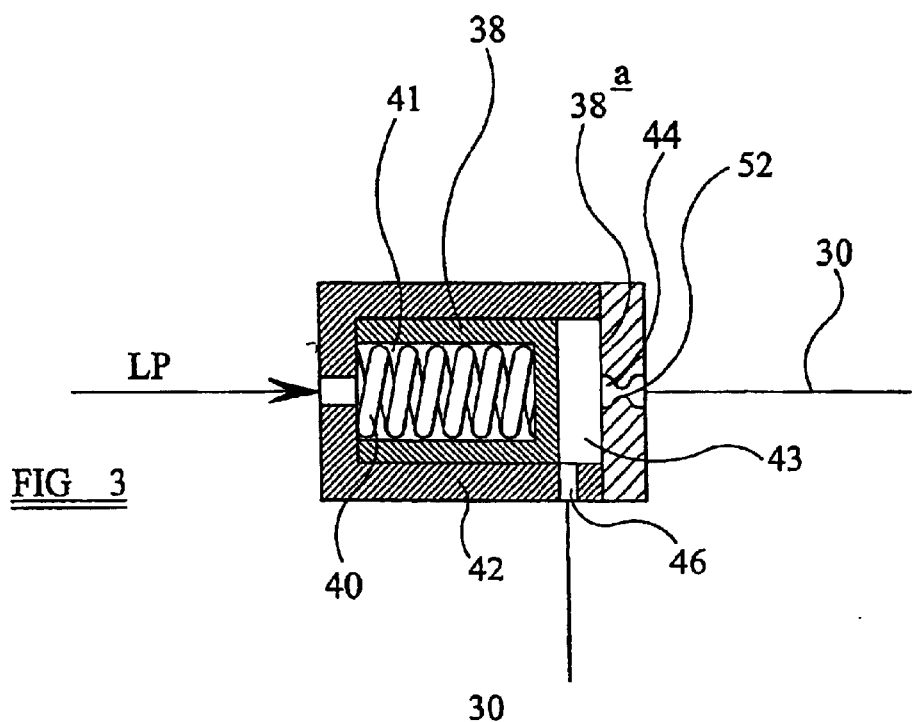

The invention will now be described, by way of example only, with reference to the accompanying drawings in which;

FIG. 1 is a block diagram of a fuel supply system for a gas turbine engine comprising the hydraulic valve arrangement of the present invention, FIG. 2 is a view of the hydraulic valve arrangement forming part of the fuel supply system in FIG. 1 when in a closed state, and FIG. 3 is a view of a part of the hydraulic valve arrangement in FIG. 2 when in a latched open state.

Referring to FIG. 1, a fuel system for a gas turbine engine comprising first and second sets 10, 12 of main engine burners and a set 14 of ignitor jets is supplied with fuel from a fuel tank 16. In an aircraft fuel system, the fuel tank 16 is typically within the wings of the aircraft, and an electric lift pump 18 is used to pump fuel from the fuel tank 16 to a first, low pressure pump 20 which is driven by the engine. The low pressure fuel pump 20 supplies a flow of fuel to a high pressure fuel pump 22, typically in the form of a gear pump, to pressurise fuel to the relatively high level required for fuelling the engine and driving hydraulically operated engine components. A pressure drop spill valve 24 is arranged across the high pressure fuel pump 22 so as to ensure the pressure differential across the pump 22 is maintained at a substantially constant level, in use. The rate of flow of fuel to the main engine burners 10, 12 and to the ignitor jets 14 is controlled by means of a metering valve arrangement 26. Fuel flowing through the metering valve arrangement 26 is delivered to a main fuel supply path 28 through which fuel is delivered to the main sets of engine burners 10, 12. Typically, one of the sets of burners 10, 12 may be a set of pilot burners which is ignited on engine start-up and which is used to ignite one or more further sets of the main engine burners. It will be appreciated that the number of main engine burners 10, 12 may be greater than the two sets shown in FIG. 1.

A pressure raising shut-off valve (PRSOV) 32 is arranged within the main supply path 28 to the main engine burners 10, 12. Typically, the pressure raising shut-off valve 32 includes a spring biased piston (not shown) which is operable hydraulically between an open position, in which it is lifted from a seating such that fuel is able to flow through the main supply path 28 to the main engine burners 10, 12, and a closed position in which the piston is seated and the flow of fuel to the main engine burners 10, 12 is prevented. The design of a conventional PRSOV 32 is such that, when the valve is in its closed position, no leakage of fuel through the main supply path 28 to the engine burners 10, 12 occurs as, even if fuel is slightly pressurised, low pressure fuel will be present on both sides of the PRSOV piston and, thus, the spring force of the PRSOV is sufficiently great that the piston remains seated.

In addition to supplying a metered flow of fuel to the main engine burners 10, 12, the flow is tapped off from the main supply path 28, at a position upstream of the PRSOV, and is supplied through a primary flow path 30 to the ignitor jets 14. The primary supply path 30 is provided with an hydraulic valve arrangement 34, as shown in further detail in FIGS. 2 and 3, for controlling the rate of flow of fuel to the ignitor jets 14.

The hydraulic valve arrangement 34 includes a first valve, referred to generally as 36, in the form of a fluid pressure actuable valve having a piston member 38 which is exposed to fuel pressure within first and second control chambers 41, 43 respectively (as shown in FIG. 3). The piston member 38 is biased, partly by means of a spring 40 arranged within the first control chamber 41 and partly by means of low fuel pressure within the first control chamber 41, into a closed position in which fuel flow through the fluid pressure actuable valve 36 is prevented. The fluid pressure actuable valve 36 in FIG. 2 is shown in this closed state. The piston member 38 is moveable within a bore 39 provided in a valve housing 42 to open and close communication between a first inlet port 46 provided in the valve housing 42 and the second control chamber 43, as will be described in further detail below.

In use, when the piston member 38 is moved out of its closed position into an open position (as shown in FIG. 3), an end face 38a of the piston member 38 is exposed to fuel pressure within the second control chamber 43. The second control chamber 43 communicates with an outlet chamber 44, defined within the valve housing 42, which communicates with an ignitor jet supply path 50 downstream of the valve 36 through a restriction 52 provided in the valve housing 42. The first inlet port 46 communicates with the primary supply path 30 upstream of the valve 36, such that high pressure fuel from the metering valve arrangement 26 is delivered to the first inlet port 46. Movement of the piston member 38 into its open state is initiated by increasing fuel pressure in the outlet chamber 44, fuel flowing through the outlet chamber 44 into the second control chamber 43 and applying a force to the end face 38a of the piston member to overcome the spring force, and the force due to fuel pressure within the first control chamber 41, thereby causing the piston member 38 to move. When the piston 38 is moved into the open state, as shown in FIG. 3, fuel is able to flow through the fluid pressure actuable valve 36 at a relatively low rate determined by the size of the restriction 52.

The valve housing 42 is also provided with a second inlet port 48 which receives fuel from a low pressure fuel reservoir, such as the fuel tank lift pump 18, the force due to fuel pressure within the second control chamber 43 serving to maintain the piston member 38 in the position shown in FIG. 3 (an open state) providing fuel pressure within the second control chamber 43 is sufficient to overcome the combined force due to fuel pressure within the first control chamber 41 and the spring 40 arranged therein.

If fuel pressure within the second control chamber 43 is reduced, the action of the spring 40 in combination with fuel pressure within the chamber 41 serves to urge the piston member 38 into a closed position (a closed state) in which high pressure fuel delivered to the first inlet port 46 is unable to flow into the outlet chamber 44 and, hence, there is no flow through the valve 36 to the ignitor jets 14.

The hydraulic valve arrangement 34 also includes a second valve, referred to generally as 54, comprising a by-pass valve member 56 in the form of a spherical or ball valve which is engageable with a seating to control fuel flow through a by-pass flow path 58. The valve member 56 is urged into engagement with its seating by means of a force due to a second spring 60 which acts on an armature 62 coupled to the valve member 56. Movement of the valve member 56 is controlled by means of an electromagnetic actuator 64. When a winding 61 of the actuator 64 is energised, the armature 62 is urged to the right in FIG. 2 against the force due to the second spring 60 such that the valve member 56 is moved away from its seating, in which position fuel is able to flow through the by-pass flow path 58 at a relatively unrestricted rate. When the electromagnetic winding 61 is de-energised, the armature 62 is urged to the left in FIG. 2 by means of the spring force and the valve member 56 is seated to prevent fuel flow through the by-pass flow path 58.

In use, when it is desired to ignite the main engine burners prior to aircraft take-off, it is necessary to deliver fuel to the ignitor jets 14. With the pumps 18, 20 and 22 operational, and with both valves 36, 54 initially closed, the winding of the electromagnetic actuator 64 is energised to move the valve member 56 away from its seating. Fuel flowing through the primary supply path 30, pressurised to a high level by means of the high pressure pump 22, is therefore able to flow through the by-pass flow path 58 and, hence, into the ignitor jet supply path 50. The ignitor jets 14 present a restriction to fuel flow in the ignitor jet supply path 50 which is greater than that presented by the restriction 52 associated with the fluid pressure actuable valve 36. Thus, fuel flow through the by-pass flow path 58 flows into the outlet chamber 44 of the fluid pressure actuable valve 36 through the restriction 52, resulting in an increase in fuel pressure within the outlet chamber 44. When fuel pressure within the outlet chamber 44 increases beyond a predetermined amount, the piston member 38 will be urged out of its closed position, against the force due to the spring 40 and low pressure fuel within the chamber 41, into its open state shown in FIG. 3, thereby opening communication between the first inlet port 46 and the second control chamber 43. A very small volume of high pressure fuel delivered to the first inlet port 46 is therefore able to flow into the second control chamber and, hence, into the outlet chamber 44, through the restriction 52 and to the downstream ignitor jets 14. However, as the second valve 54 is also open, fuel flows through the second valve 54 at a relatively high rate, the rate of fuel delivered to the ignitor jets 14 therefore being relatively high for the purpose of initiating start-up of the main engine burners 10, 12.

When the main engine burners 10, 12 are fully ignited and there is no longer a need for a relatively high flow rate of fuel to the ignitor jets 14, the winding 61 of the electromagnetic actuator 64 is de-energised, thereby causing the valve member 56 to be urged into engagement with its seating by means of the spring 60. In such circumstances, the rate of flow of fuel into the ignitor jet supply path 50 will be reduced as the by-pass flow path 58 is closed. It will be appreciated that, following the initial opening of the fluid pressure actuable valve 36 to move the piston member 38 into a position in which the first inlet port 46 communicates with the outlet chamber 44, the fuel pressure acting on the end face 38a of the piston member 38 due to fuel pressure within the second control chamber 43 is sufficient to maintain the fluid pressure actuable valve 36 in its open position (as shown in FIG. 3). Thus, when the second valve 54 is closed to break the flow of fuel through the by-pass flow path 58, a relatively low rate of flow of fuel to the ignitor jets 14 is maintained. This provides the advantage that, following engine start-up when the main engine burners 10, 12 are ignited and there is no longer a need to provide a high fuel flow rate to the ignitor jets 14, a relatively low rate of fuel flow to the ignitor jets 14 can be maintained for cooling purposes. The cooling flow of fuel to the ignitor jets 14 at a relatively low rate serves to prevent carbonisation within the burners and the associated supply pipes which may otherwise result in blockage of the jets.

A further advantage is obtained in that, if one of the main engine burners 10, 12 suffer 'flame-out' and it is necessary to re-light the burners whilst the engine is operating, the second valve 54 may be switched to its open state by energising the actuator winding 61, thereby permitting fuel flow through the by-pass flow path 58 at a higher rate. The high rate of fuel flow to the ignitor jets 14 which is required for engine re-ignition is therefore provided.

It will be appreciated that, once the fluid pressure actuable valve 36 has been moved to its open state, in which the piston member 38 is urged into an open position (as shown in FIG. 3) to permit communication between the first inlet port 46 and the outlet chamber 44, the valve 36 is in a 'latched-open' state and subsequent switching of the second valve 54 between its open and closed positions does not affect the valve 36.

When the aircraft has landed and it is no longer desirable for fuel to flow to the ignitor jets 14, the low and high pressure pumps 20, 22 respectively are deactivated such that the pressure of fuel flowing into the primary supply path 30 is reduced. As fuel pressure delivered to the primary supply path 30 is reduced, fuel pressure within the second control chamber 43 is reduced such that the force due to the spring 40, acting in combination with the force due to low pressure fuel within the first control chamber 41, is sufficient to urge the piston member 38 towards its closed position, as shown in FIG. 2. When the piston member 38 is moved into its closed position, fuel is unable to flow through the first inlet port 46 into the outlet chamber 44. Thus, if the winding 61 of the electromagnetic actuator 64 is de-energised, such that the valve member 56 is seated, fuel is prevented from flowing both through the fluid pressure actuable valve 36 and through the second valve 54. Any leakage of fuel to the ignitor jets 14 is therefore prevented.

It will be appreciated that, even in circumstances in which operation of the lift pump 18 is maintained when the aircraft has landed, the provision of the hydraulic valve arrangement 34 ensures fuel leakage to the ignitor jets 14 is prevented. It can often be desirable to maintain operation of the lift pump when the aircraft has landed. For example, the lift pump 18 may be required for maintenance or test functions, or it may be desirable to maintain some of the aircraft electrical loads if the aircraft is only on the ground for a relatively short period of time. Additionally, the aircraft auxiliary power unit (APU) used to supply power to the aircraft whilst it is on the ground, may be supplied with fuel from the lift pump 18.

The present invention therefore provides several advantages over known fuel supply systems for gas turbine engines. The advantages are provided by the latching function of the fluid pressure actuable valve 36 as this permits the rate of flow of fuel to the ignitor jets 14 to be varied between a first, relatively high level in order to initiate ignition of the burners, and a second, relatively low level once the burners have ignited, simply by switching the second valve 54. The hydraulic valve arrangement also ensures any leakage flow to the ignitor jets 14 when the aircraft is landed is avoided.

Although the hydraulic valve arrangement of the present invention has been described in relation to a fuel system for a gas turbine engine, it will be appreciated that the valve 34 may be used in other applications in which it is desirable to switch between first and second fluid flow rates through a flow path, whilst ensuring the flow can be prevented altogether when the valve is in an unlatched state. It will further be appreciated that the second valve 54 need not take the form of an electromagnetically operated valve, but may be actuated by alternative means. Additionally, the spherical valve member 56 may be replaced by various other types of valve member, engageable with correspondingly formed seatings, to control the flow of fuel through the by-pass flow path 58.

It should be noted that, in order to ensure the fluid pressure actuable valve 36 is maintained in the open, latched position when the second valve 54 is switched between its open and closed states, the restriction to fuel flow through the ignitor jet supply path 50 caused by the restriction 52 must be sized to ensure that the pressure within the second control chamber 43 is high enough to maintain a sufficiently high force on the end face 38a of the piston member 38 to oppose the combined force of the spring 40 and low pressure fuel within the first control chamber 41. This serves to maintain the piston member 38 in an open position and ensures that at least a relatively low rate of fuel flow through the primary supply path 30 to the ignitor jet supply path 50 is maintained, until such time as the supply of high pressure fuel to the valve 34 is removed.

I claim:

1. An hydraulic valve arrangement arranged to control the rate of flow of fuel to a gas turbine engine comprising: a fluid pressure actuable valve which is actuable between a first position in which fluid flow through the fluid pressure actuable valve is prevented and a second position in which fluid flow through the fluid pressure actuable valve is permitted at a first rate; and a second valve which is actuable between an open state, in which there is flow of fluid through the second valve at a second rate, and a closed state in which there is no flow through the second valve; the fluid pressure actuable valve being arranged such that, upon initial actuation of the second valve to its open state, the fluid pressure actuable valve is caused to move into the second position; and whereby the fluid pressure actuable valve remains in the second position upon subsequent switching of the second valve between the open and closed states, thereby to permit the rate of flow of fuel through the hydraulic valve arrangement to be varied by switching of the second valve.

2. An hydraulic valve arrangement as claimed in claim 1, wherein the fluid pressure actuable valve includes a resiliently biased piston member which is moveable between a first position, in which fluid flow through the fluid pressure actuable valve is prevented, and a second position in which fluid flow through the fluid pressure actuable valve occurs at a relatively restricted rate.

3. An hydraulic valve arrangement as claimed in claim 1, wherein the fluid pressure actuable valve includes first and second control chambers for fluid, whereby the position of the piston member is controlled by controlling fluid pressure in at least one of the control chambers.

4. An hydraulic valve arrangement as claimed in claim 3, wherein the fluid pressure actuable valve is arranged within a primary flow path for fluid, the primary flow path being provided with a first restriction through which fluid flows at the relatively restricted rate when said valve is in its second position.

5. An hydraulic valve arrangement as claimed in claim 1, wherein the second valve comprises a by-pass valve member which is engageable with a seating to control fluid flow through a by-pass flow path which allows flow to the gas turbine engine by-passing said fluid pressure actuable valve.

6. An hydraulic valve arrangement as claimed in claim 5, wherein the fluid pressure actuable valve and the second valve are arranged such that, upon initial actuation of the second valve to the open state, fluid flows through the by-pass flow path into the second control chamber, thereby applying a force to the piston member to urge the piston member into the second position.

7. An hydraulic valve arrangement as claimed in claim 6, wherein the by-pass valve member is actuable by means of an electromagnetic actuator.

8. An hydraulic valve arrangement as claimed in claim 2, wherein the first control chamber of the fluid pressure actuable valve is arranged to receive fluid at low pressure from a low pressure reservoir, the pressure of fluid within the first control chamber acting in combination with a spring force to urge the piston member towards the first position.

* * * * *